(12) United States Patent
Zhou (10) Patent No.: US 10,277,824 B2
(45) Date of Patent: Apr. 30, 2019

(54) TIME MULTIPLEXING PROGRAMMABLE FIELD OF VIEW IMAGING

(71) Applicant: Visbit Inc., Sunnyvale, CA (US)

(72) Inventor: Changyin Zhou, San Jose, CA (US)

(73) Assignee: Visbit Inc., Sunnyvale, CA (US)

( * ) Notice: Subject to any disclaimer, the term of this patent is extended or adjusted under 35 U.S.C. 154(b) by 145 days.

(21) Appl. No.: 15/454,742

(22) Filed: Mar. 9, 2017

(65) Prior Publication Data

US 2017/0264829 A1 Sep. 14, 2017

Related U.S. Application Data

(60) Provisional application No. 62/306,615, filed on Mar. 10, 2016.

(51) Int. Cl.
| | |
|---|---|
| H04N 5/232 | (2006.01) |
| H04N 3/08 | (2006.01) |
| H04N 5/225 | (2006.01) |
| H04N 5/04 | (2006.01) |
| G02B 26/08 | (2006.01) |
| G02B 13/06 | (2006.01) |
| G02B 13/00 | (2006.01) |

(52) U.S. Cl.
CPC .......... *H04N 5/23296* (2013.01); *H04N 3/08* (2013.01); *H04N 5/2259* (2013.01); *G02B 13/0055* (2013.01); *G02B 13/06* (2013.01); *G02B 26/0816* (2013.01); *H04N 5/04* (2013.01); *H04N 5/23238* (2013.01); *H04N 5/23274* (2013.01)

(58) Field of Classification Search
None
See application file for complete search history.

(56) References Cited

U.S. PATENT DOCUMENTS

| | | | | |
|---|---|---|---|---|
| 4,952,809 A * | 8/1990 | McEwen | ................... | H04N 5/33 250/203.1 |
| 5,889,553 A * | 3/1999 | Kino | ...................... | H04N 5/349 348/208.99 |
| 6,587,597 B1 * | 7/2003 | Nakao | .................... | H04N 5/232 348/139 |
| 6,654,063 B1 | 11/2003 | Tadatsu | | |

(Continued)

FOREIGN PATENT DOCUMENTS

| | | |
|---|---|---|
| JP | 08-194809 | 7/1996 |
| JP | 2008-263251 | 10/2008 |

OTHER PUBLICATIONS

International Searching Authority, International Search Report and Written Opinion dated Jun. 20, 2017, issued in connection with International Application No. PCT/US2017/021621, filed on Mar. 9, 2017, 11 pages.

*Primary Examiner* — Cynthia Segura
(74) *Attorney, Agent, or Firm* — McDonnell Boehnen Hulbert & Berghoff LLP (57) ABSTRACT

The present disclosure relates to systems and methods that employ a mechanical method for adjusting camera field angles at a high speed. The adjustments may be synchronized to a high speed image capture process. As such, multiple frames can be captured without experiencing significant object movement or hand shake. The systems and methods may be used to capture videos and/or photo stitching, because both camera position and objects in the scene are static during the high speed image capture.

21 Claims, 11 Drawing Sheets

(56) References Cited

U.S. PATENT DOCUMENTS

| | | | | |
|---|---|---|---|---|
| 6,816,156 B2* | 11/2004 | Sukeno | ................... | G09G 5/10 |
| | | | | 345/204 |
| 9,967,470 B2* | 5/2018 | Paz | ................... | H04N 5/23296 |
| 2002/0109772 A1* | 8/2002 | Kuriyama | ................ | G02B 5/10 |
| | | | | 348/36 |
| 2003/0025790 A1* | 2/2003 | Smith | ................. | H04N 5/2357 |
| | | | | 348/143 |
| 2007/0035617 A1 | 2/2007 | Ko et al. | | |
| 2009/0002797 A1* | 1/2009 | Kwong | ............... | H04N 5/2259 |
| | | | | 359/225.1 |
| 2010/0284015 A1* | 11/2010 | Sewell | ............... | G03F 7/70266 |
| | | | | 356/450 |
| 2012/0242787 A1 | 9/2012 | Oh | | |
| 2014/0247379 A1* | 9/2014 | Najmabadi | ........ | G01N 21/6458 |
| | | | | 348/295 |
| 2016/0127641 A1* | 5/2016 | Gove | ................... | G06T 1/0007 |
| | | | | 348/143 |
| 2016/0295128 A1* | 10/2016 | Schnittman | ........ | G06K 9/00255 |

* cited by examiner

TIME MULTIPLEXING PROGRAMMABLE FIELD OF VIEW IMAGING

CROSS REFERENCE TO RELATED APPLICATION

This application claims priority to U.S. Provisional Patent Application No. 62/306,615 filed on Mar. 10, 2016, herein incorporated by reference in its entirety.

BACKGROUND

Adjusting a field of view (FOV) of a scene during an image capture process may be performed in various ways.

First, an optical zoom lens may be interposed in an optical path between the image capture device and the scene. However, the optical zoom lens cannot change a shape of the field of view as needed and is often more complicated and bulky than a fixed focal length lens.

Second, multiple images may be captured at different angles by rotating a single camera and stitching the multiple images together. However, physical rotation of the camera is usually slow because a camera can be heavy. As such, this method may not be able to capture dynamic (e.g., quickly changing) scenes or video.

Third, a single camera may be used to capture a large FOV. For example, a fisheye lens may capture photos of >180 degree FOV and some catadioptric lens designs allow one camera to capture 360 degree FOV within a single shot. However, these large FOV photos often come with much less detail than a traditional camera, because fewer pixels are included in a given angle range within the FOV. Also, these wide FOV designs often introduce strong geometrical distortion, which may degrade image quality.

Fourth, multiple cameras may be used to capture images of different angles simultaneously. The multiple images from the different cameras may then be stitched together. For example, two fisheye cameras may be arranged back to back, each covering 180 degree FOV. By stitching their photos together, one may get a 360 degree spherical photo. However, a multiple camera system is usually complicated, bulky, and expensive.

SUMMARY

In an aspect, a system is provided. The system includes a camera, a mirror optically coupled to the camera, and a motor coupled to the mirror. The system further includes a controller having a memory and at least one processor. The at least one processor is configured to execute instructions stored in the memory so as to carry operations. The operations include adjusting the motor to a first position such that the camera has a first field of view. The operations also include capturing, via the camera, an image frame of the first field of view. The operations further include repeating the adjusting and capturing steps at respective positions and respective fields of view until a plurality of image frames have been captured that include a predetermined field of view. The predetermined field of view includes an angle greater than the first field of view. The operations yet further include combining the plurality of image frames so as to form an output image frame.

In an aspect, a method is provided. The method includes adjusting a motor to a first position. The motor is coupled to a mirror and the mirror is optically coupled to a camera. The adjusting is performed such that the camera has a first field of view. The method further includes capturing, via the camera, an image frame of the first field of view. The method also includes repeating the adjusting and capturing steps at respective positions and respective fields of view until a plurality of image frames have been captured that include a predetermined field of view. The predetermined field of view includes an angle greater than the first field of view. The method yet further includes combining the plurality of image frames so as to form an output image frame.

In an aspect, a system is provided. The system includes various means for carrying out the operations of the other respective aspects described herein.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

The present disclosure relates to a system and method operable to adjust camera field angles at high speed. The field angle adjusting may be synchronized with a high speed image capture process. As such, multiple frames may be captured within a short time period, avoiding the effects of object movement and/or camera shake due to hand-holding. The present system and method may capture images for use in photo stitching and/or wide FOV (e.g., 360° FOV) video.

II. Example Systems

Figure 1:
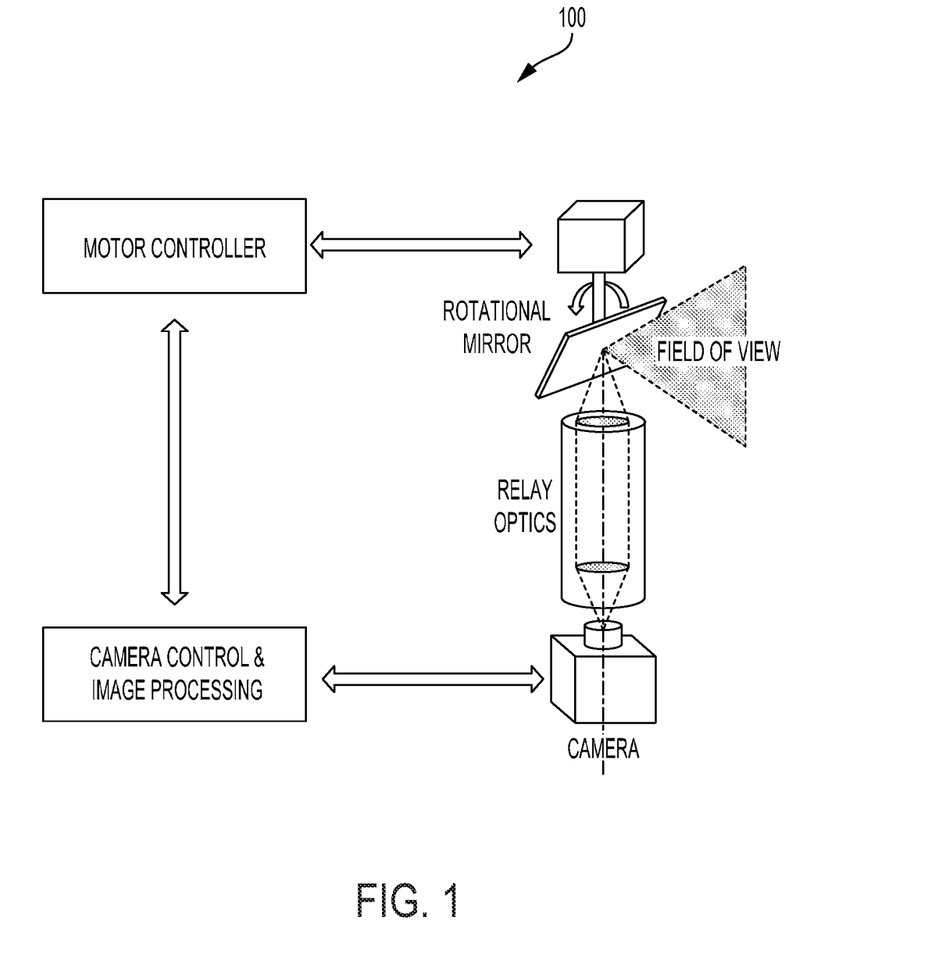
FIG. 1 illustrates a schematic diagram of a system, according to an example embodiment.

The present disclosure utilizes time multiplexing to capture photo or video of variable field of view (VFOV) using a single camera. FIG. 1 illustrates a schematic diagram of a system 100, according to an example embodiment. The system 100 includes a camera and relay optic that can guide light in various directions and, at the same time, expose a lens stop. The system 100 also includes a rotational mirror that may adjust a field of view (e.g. field angle) of the camera. System 100 additionally includes a motor controller that reads the status of rotational mirror and controls the mirror movements. System 100 yet further includes a camera control and image processing system that a) reads data from the camera and controls the camera and b) reads data from the motor controller and controls the motor controller. The system 100 may include a control panel, one or more buttons, a touchpad, or another type of input device.

The system 100 may accept one or more control inputs (e.g., via a shutter button or another type of shutter release signal or mechanism) to initiate (or start and stop) an image capture process. In such a scenario, the various steps or blocks described herein may be carried out in response to the control input. That is, a user may push a shutter button once and the system 100 may automatically carry out one or more image capture sequences so as to provide one or more VFOV output image frames.

Note that in this system, the rotational mirror is the only moving part, and can be made small and light. It is much easier and takes less power to move a small object fast. A small and light rotational mirror makes it possible to incorporate this system into portable consumer devices.

A. Time Multiplexing for VFOV Photo Capturing

Figure 2:
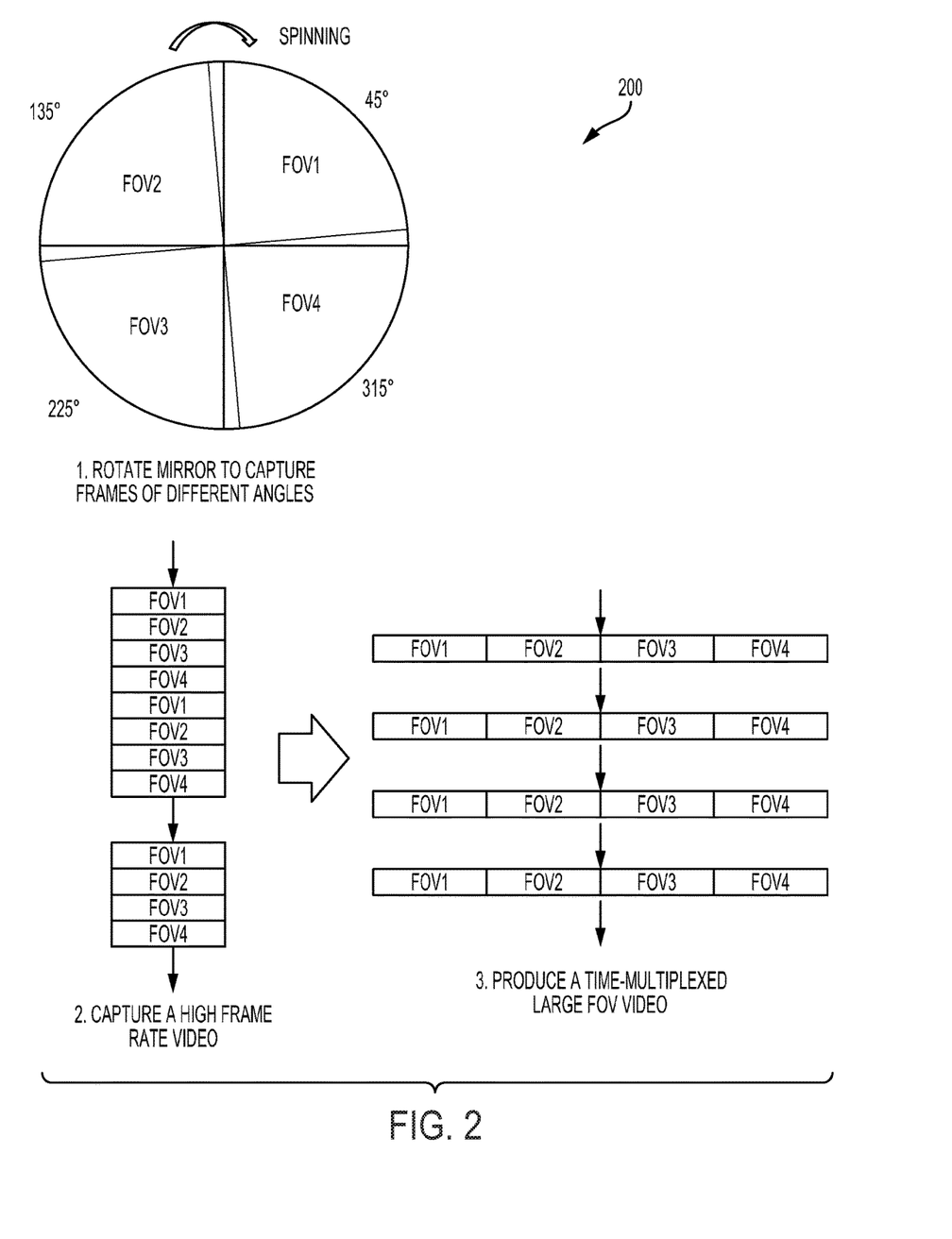
FIG. 2 illustrates a system, according to an example embodiment.

As the mirror rotates, the field of view of the camera will scan across the whole 360 degrees. In an example embodiment, the system takes multiple images as the mirror rotates and stitches them into a 360 degree image. FIG. 2 illustrates a system 200, according to an example embodiment. As shown in FIG. 2, four images may be captured when the mirror rotates to the angle of 45°, 135°, 225°, and 315°, respectively. Each image has a horizontal field of view (FOV) larger than 90°. Then, by stitching the four photos together, a 360° output image may be formed. If the mirror only rotates between two angles, then we can stitch an output image of ~180° FOV. By controlling how the mirror is rotated and when images are captured, the system can output images having various FOVs. For image stitching, it may be desirable to make sure there is overlap between consecutive images to avoid gaps in the output image. As such, the system and method herein may capture images based on a predetermined image overlap. Precise control of the motor rotation may minimize the required overlap and the predetermine image overlap may be determined based on a motor control error or mirror position uncertainty.

B. Time Multiplexing for VFOV Video Capturing

In another embodiment, the system can capture images as the mirror rotates and the images may be converted into a 360° video (or any other smaller angle amount). FIG. 2 shows a spinning mirror with four image capture positions as one example. With the spinning mirror, the system captures frames for FOV1, FOV2, FOV3, and FOV4 repeatedly; an image processing algorithm stitches every four consecutive frames into one large field of view frames, and so converts a high frame-rate, but narrow FOV video (as shown in the middle diagram of FIG. 2), into a lower frame-rate but large FOV video (as shown in the last diagram of FIG. 2).

C. Relay Optics

One function of relay optics in the system is to expose the aperture stop of the camera. Since the aperture stop usually defines, or corresponds to, the smallest beam diameter in the optical path, we can minimize the size of the reflective rotational mirror by placing it at or near the position of the aperture stop. To achieve fast rotational speeds, minimizing the size and weight of the rotational mirror is important.

Figure 3:
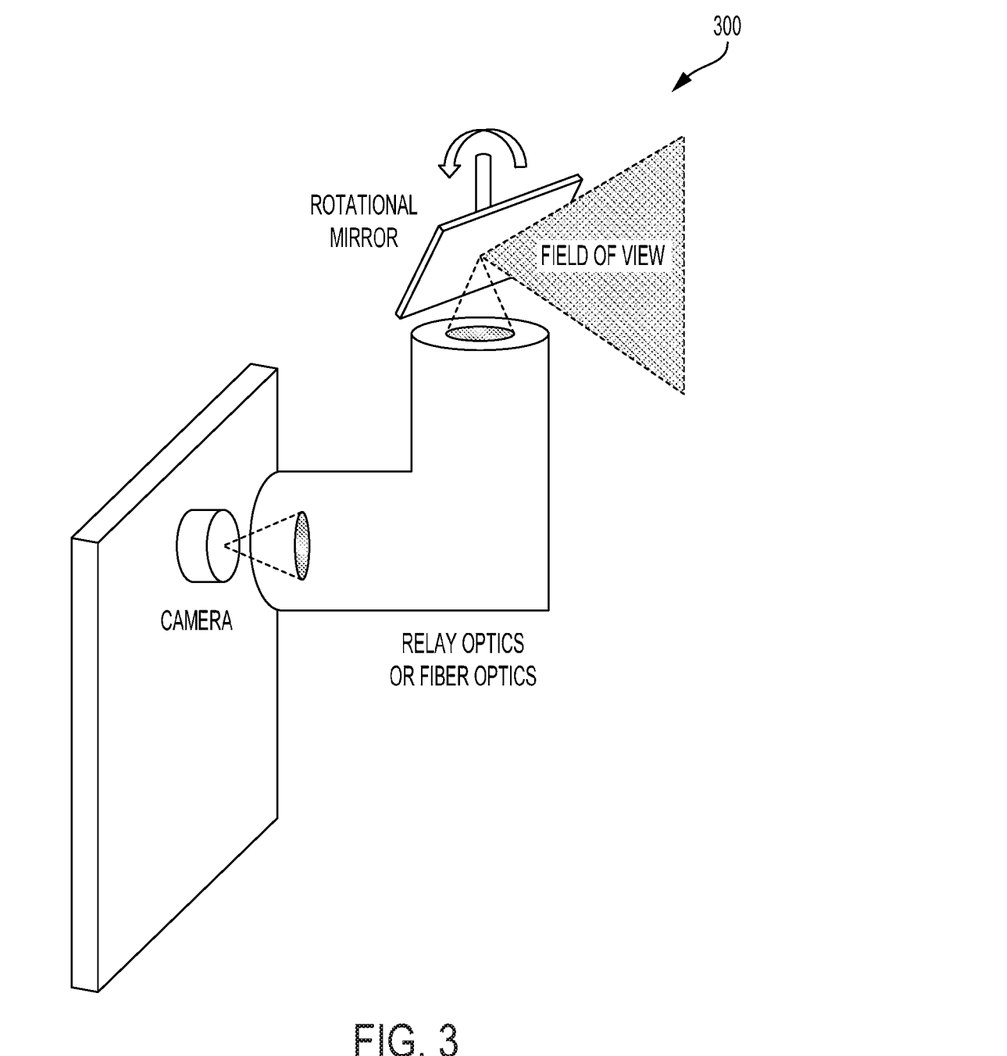
FIG. 3 illustrates a system with relay optics, according to an example embodiment.

In addition, without relay optics, the rotational mirror may collide with the camera body, or the reflected FOV may be blocked, at least in part, by the camera body, especially when the camera FOV is large or the camera body is large. FIG. 3 illustrates a system 300 with relay optics, according to an example embodiment. The system 300 may include an image capture device, such as a smartphone, tablet, laptop, wearable computer, or another type of camera. Namely, the relay optics may serve to guide an exit pupil to the top of the image capture device, so that when the rotational mirror spins, the camera field of view will not be blocked by the body of the image capture device. In an example embodiment, the relay optics may change a position of an exit pupil of a smartphone so that the rotation mirror is not blocked by the smartphone body.

In another embodiment, the relay optics can be modified to increase the camera field of view.

Figure 4:
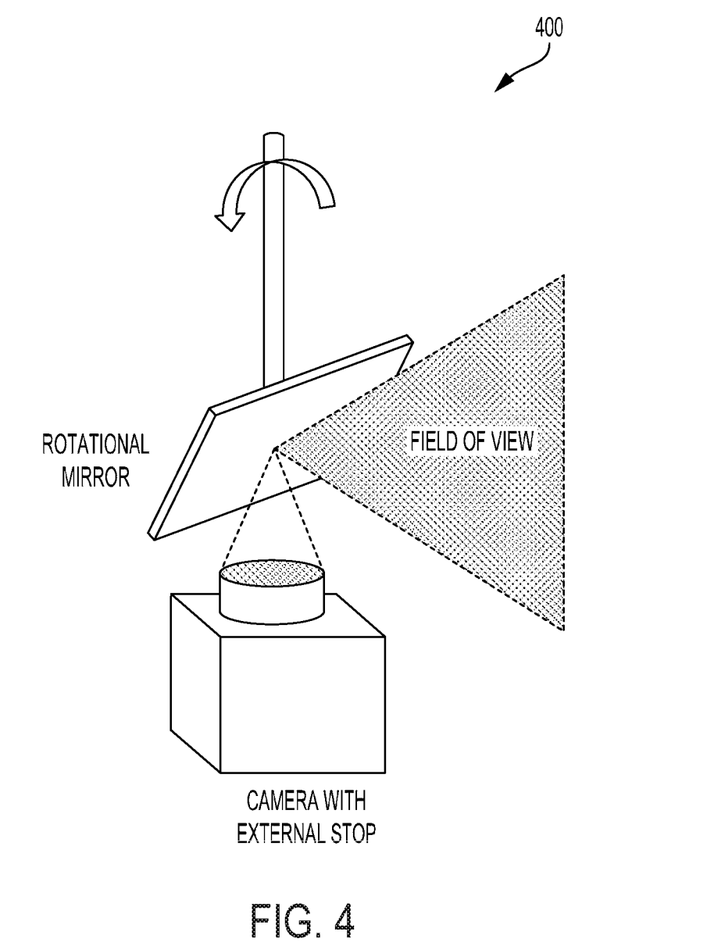
FIG. 4 illustrates a system without relay optics, according to an example embodiment.

In another embodiment, the relay optics may be removed from the system. FIG. 4 illustrates a system 400 without relay optics, according to an example embodiment. In embodiments where the rotational mirror does not collide with camera body and the reflected FOV is not blocked by camera body, the relay optics may be removed, as shown in FIG. 4. The lens in FIG. 4 may include an external aperture stop, so that the distance between the mirror and the camera may be maximized to avoid FOV blocking.

D. Rotational Mirror

In an example embodiment, a flat rotational mirror is used so that the camera field of view will not be altered (e.g. distorted). In such a scenario, the mirror is placed close to the external stop of the optical system.

In another embodiment, a spherical mirror may be used to increase both horizontal and vertical field of view.

In another embodiment, a cylindrical mirror may be used to increase horizontal (or vertical) field of view and keep the vertical (or horizontal) field of view unchanged (e.g. distorted along a first axis, but undistorted along a second axis).

The camera control module and the motor control module may communicate via a wired connection, or wirelessly by WiFi or BLUETOOTH. Other wireless communication protocols are contemplated.

III. Example Methods

The rotational mirror and image capture methods described herein may be performed in different ways to adapt to different camera systems, and to achieve different results. Listed below are several non-limiting modes in which this system may operate.

A. Rotate Mirror and Capture Frame in a Ping-Pong Sequence

Figure 5:
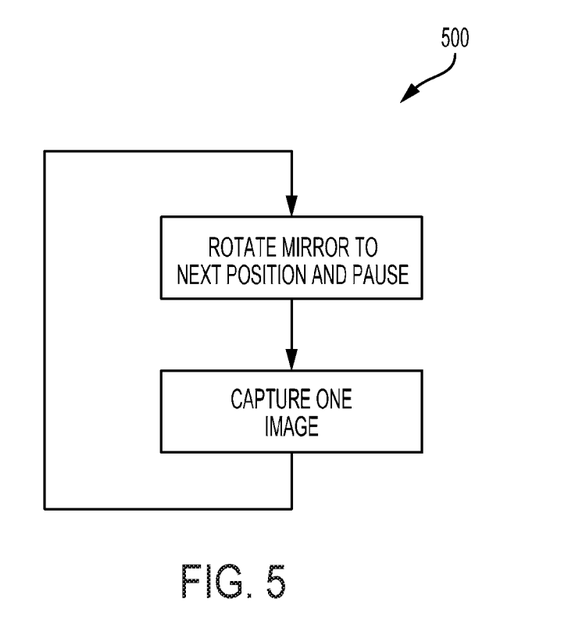
FIG. 5 illustrates a method, according to an example embodiment.

Capturing an image while the mirror is still moving may cause motion blur. To minimize motion blur, the mirror movement needs to be minimized during exposure. FIG. 5 illustrates a method 500, according to an example embodiment. As shown in method 500, the system synchronizes mirror rotation and camera exposure so that the mirror only moves after an image frame is captured and before the next image capture starts.

Figure 6:
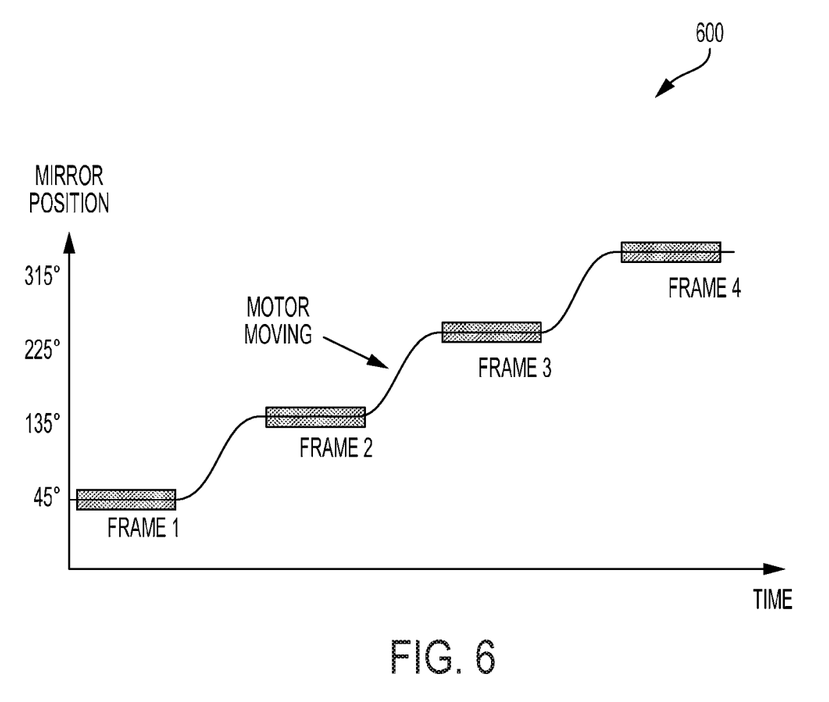
FIG. 6 illustrates an operational timeline, according to an example embodiment.

FIG. 6 illustrates an operational timeline 600, according to an example embodiment. The operational timeline 600 illustrates an example sequence of motor motion and frame capture. In order to capture and stitch a 360° photo, at least one image frame is captured for every stable position of the mirror as shown in FIG. 6. As described elsewhere herein, the method may be initiated or otherwise controlled by pushing a shutter button. Other user interactions are possible to initiate, stop, select from, and/or control the capture modes described herein.

Figure 7:
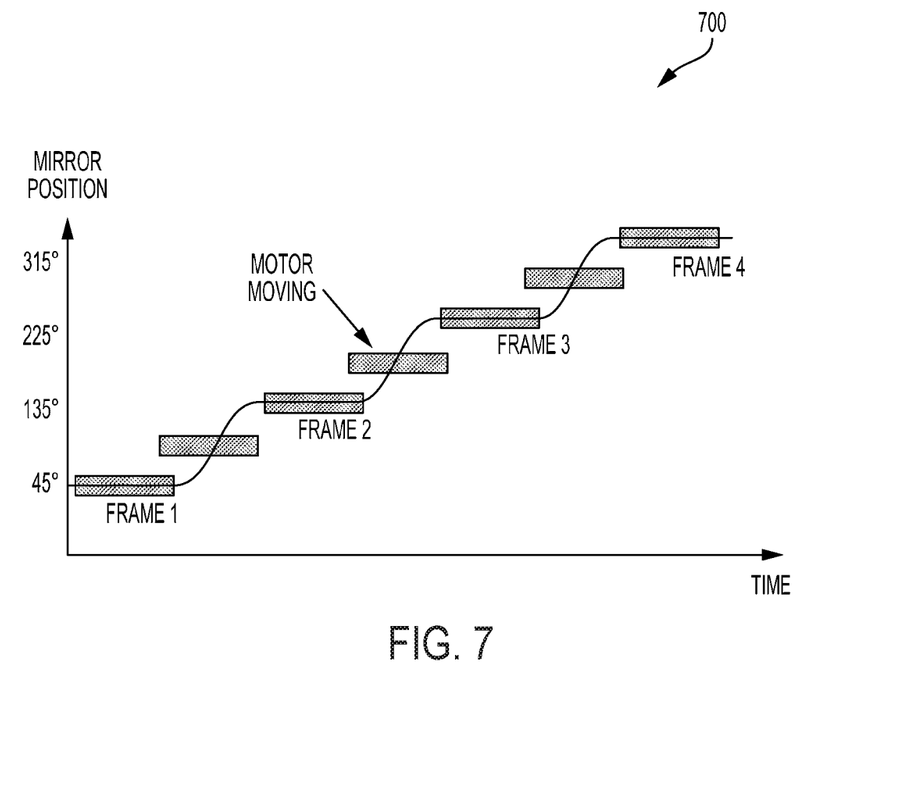
FIG. 7 illustrates an operational timeline, according to an example embodiment.

B. Capture Frame Continuously while Synchronize Frame Exposure and Mirror Movement FIG. 7 illustrates an operational timeline 700, according to an example embodiment. Operational timeline 700 illustrates another scenario in which the system captures frames in a continuous mode and the mirror motion is synchronized so that one frame starts exposure when mirror stops, and completes exposure before mirror starts to move again. By comparing the frame timestamp and the motor timestamp, captured image frames without image blur may be identified. Alternatively, an image processing routine can be employed to detect and remove blurred frames. The selected frames are shown in FIG. 7 as Frame 1, Frame 2, Frame 3, and Frame 4, which can be stitched to be a 360° photo. If the camera works in a video mode, four image frames without motion blur can be extracted from every consecutive eight image frames, and these four image frames will be stitched into one 360° image frame. As a result, a 360° video may be output at a lower framerate as compared to the actual image capture rate.

C. Capture Video and Rotate Mirror Asynchronously (Global Shutter Image Sensor)

Figure 8:
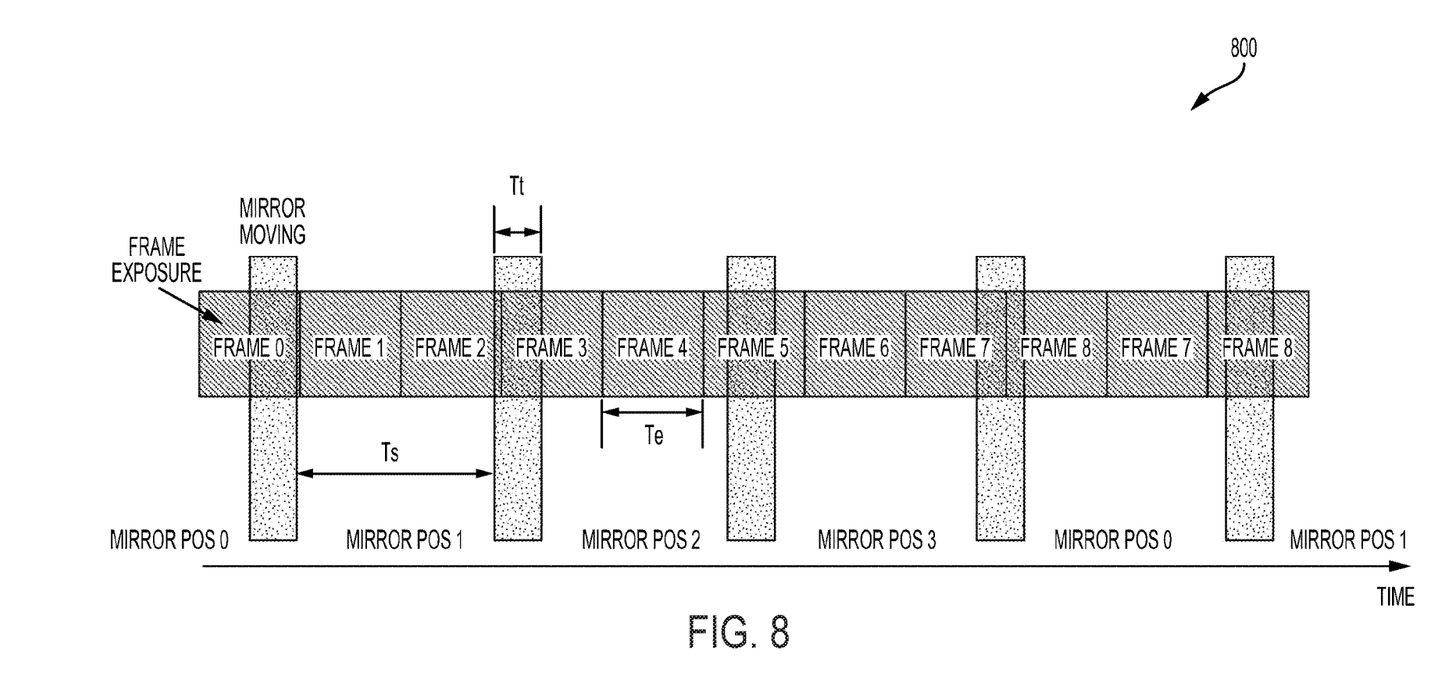
FIG. 8 illustrates an operational timeline, according to an example embodiment.

In another embodiment, synchronization between frame capture and mirror rotation need not be required. FIG. 8 illustrates an operational timeline 800, according to an example embodiment. In such a scenario, operational timeline 800 illustrates how to rotate the mirror and capture image frames asynchronously so that 360° continuous video can still be produced. In FIG. 8, a blue block shows when a frame exposure starts and ends; the orange block shows when a motor starts and ends moving; and the mirror rests at position 0, 1, 2, and 3 between motor movement. The notations are:

Te denotes the exposure time of each frame;
Ts denotes the time between motor movements; and
Tt denotes the time while the motor is moving.

In the scenario illustrated in FIG. 8, the image sensor may have a single global shutter for all pixels of an image sensor. As such, each pixel may start and end exposure at the same time.

As mentioned above, a frame may suffer from motion blur if the mirror is moving during image frame exposure. To stitch a complete 360 degree photo or video, at least one photo should be captured for every motor position. To capture such 360 degree photos or videos, the exposure time (Te) of each frame (captured continuously) should be less than half of the time between motor movements (Ts). That is, if Ts>=2×Te, at least one frame will be captured with no mirror motion for every mirror position. As a result, the speed of motor movement and exposure time may be determined such that Ts>=2×Te, and then it is guaranteed that there is at least one good frame for each mirror position. For example, in FIG. 8, Frame 1, 4, 6, and 7 are good (captured with no mirror motion) for Mirror positions 1, 2, 3, and 0, respectively. By stitching these four frames together, the system gets one 360 degree frame of a 360 degree video.

In an example embodiment, a "good" frame may be determined as follows:

For an arbitrary frame with a global shutter,
a) Read the start timestamp: t0, and compute its end timestamp as t1=t0+Te.
b) Check if mirror is moving during time from t0 to t1?
1. Yes: Frame is bad.
2. Otherwise, Frame is good.

Another way to determine a good frame is by comparing the sharpness of each frame. That is a "good" frame should be sharper than an adjacent, or neighbor, "bad" frame.

D. Capture Video and Rotate Mirror Asynchronously (Rolling Shutter Image Sensor)

Figure 9:
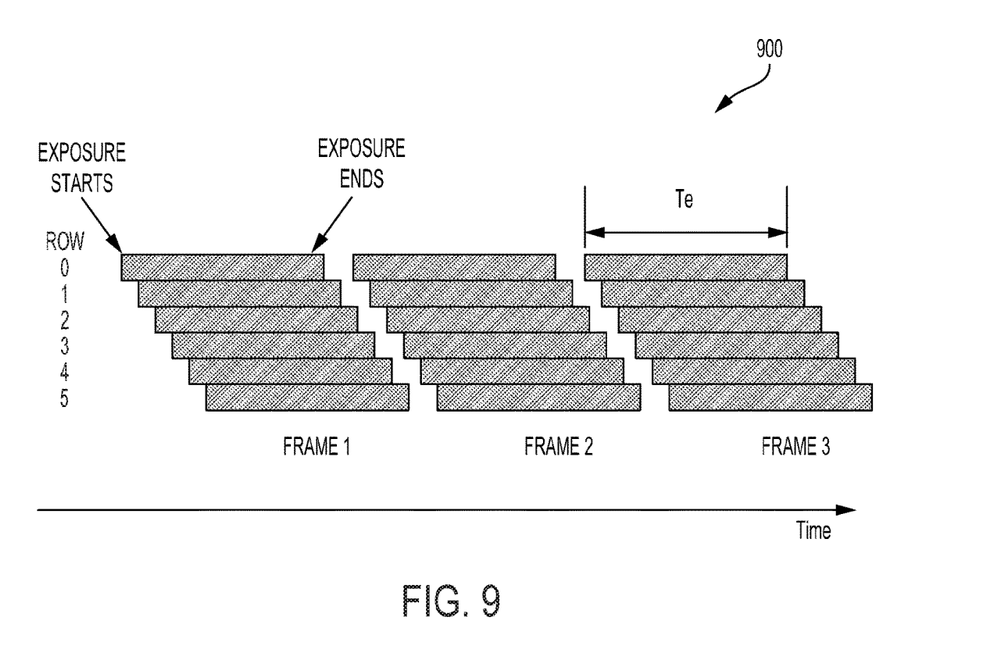
FIG. 9 illustrates an operational timeline, according to an example embodiment.
Figure 10:
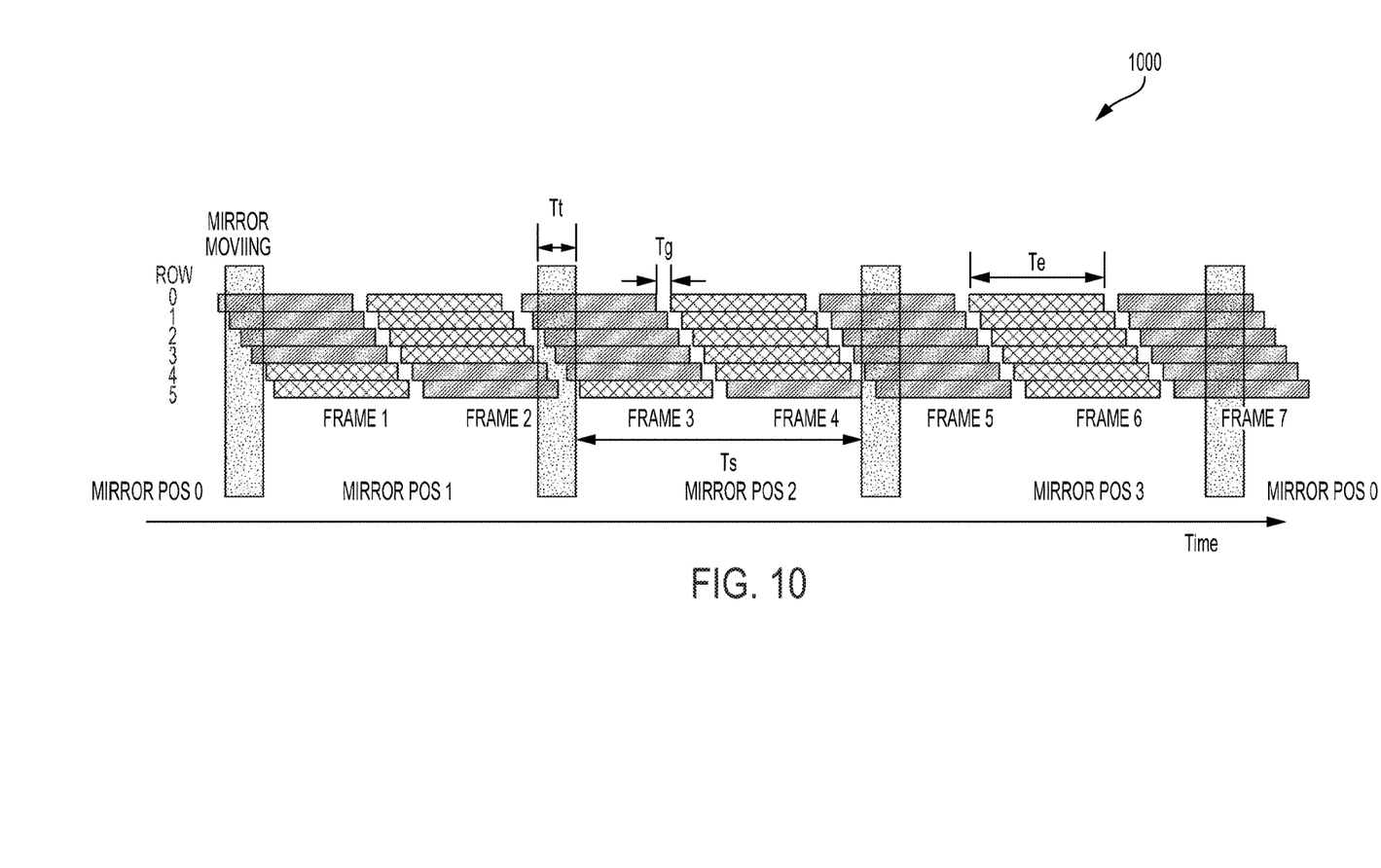
FIG. 10 illustrates an operational timeline, according to an example embodiment.

Image sensors in many modern smartphones or other cameras have a rolling shutter instead of a global shutter. FIG. 9 illustrates an operational timeline 900, according to an example embodiment. For an image sensor with a rolling shutter, each row of pixels starts and ends exposure at different time points, as shown in FIG. 9. Accordingly, while one row is correctly captured (e.g., captured with a non-moving mirror), another row in the same frame may be corrupted by mirror motion. FIG. 10 illustrates an operational timeline 1000, according to an example embodiment. As shown in FIG. 10, Row 0-3 in Frame 1 in FIG. 10 are bad (as they are captured during mirror movement); and Row 4-5 are good or captured with no mirror movement. Good rows are highlighted in Red in FIG. 10.

In this system, the motor speed and the frame capture time may be configured in such a way that Ts>=2×(Te+Tg), where Tg is the time after a given row ends exposure and before the given row starts exposure for next frame. Tg may include, for example, a pixel readout time and a pixel reset time. In such a scenario, it is guaranteed that for each sensor row and each mirror position, there is at least one good row captured. By stitching all rows captured with no mirror movement together, we get a complete image frame for each static mirror position. Then, by stitching all correctly captured frames together for a complete cycle of all mirror positions, we get a correctly captured 360 degree frame. As such, a 360 degree image frame and/or video may be captured.

One way to determine if one row is correctly captured or not is as follows:

For each frame
a) Read the timestamp of Row 0: t0.
b) For each Row i
  i) Compute the start timestamp Ai=t0+i×s, where s is time difference between consecutive rows in rolling shutter.
  ii) Compute the end timestamp Bi=Ai+Te, where Te is exposure time.
  iii) Is mirror moving during time from Ai to Bi?
    1) Yes: Row i is captured during mirror movement ("bad").

2) Otherwise, Row i is captured without mirror movement ("good").

In this example, each frame covers a horizontal >90 degree field of view, and each mirror position is 90 degrees apart from adjacent mirror positions. By stitching four consecutive frames, we get a 360 degree FOV output image frame. As an example embodiment, a process to produce a 360 degree video out of the proposed system is as follows:

---

1. Set q = −1
2. Set k = 0
3. Set i = 0
4. While i < total frame number
   a) Find all good rows in this frame, copy them to Image H;
   b) Let p = mirror position, ranging from 0 to 3.
   c) If p is not equal to q
      i) if q == 3
         1) Stitch F_0, F_1, F_2, F_3 to Image Gk
         2) k = k+1
      ii) Copy H to F_p
   d) i = i + 1
5. Encode all images Gk to provide a video.

---

E. Capture Video of Various Frame Rates at Different Field Angles.

Figure 11:
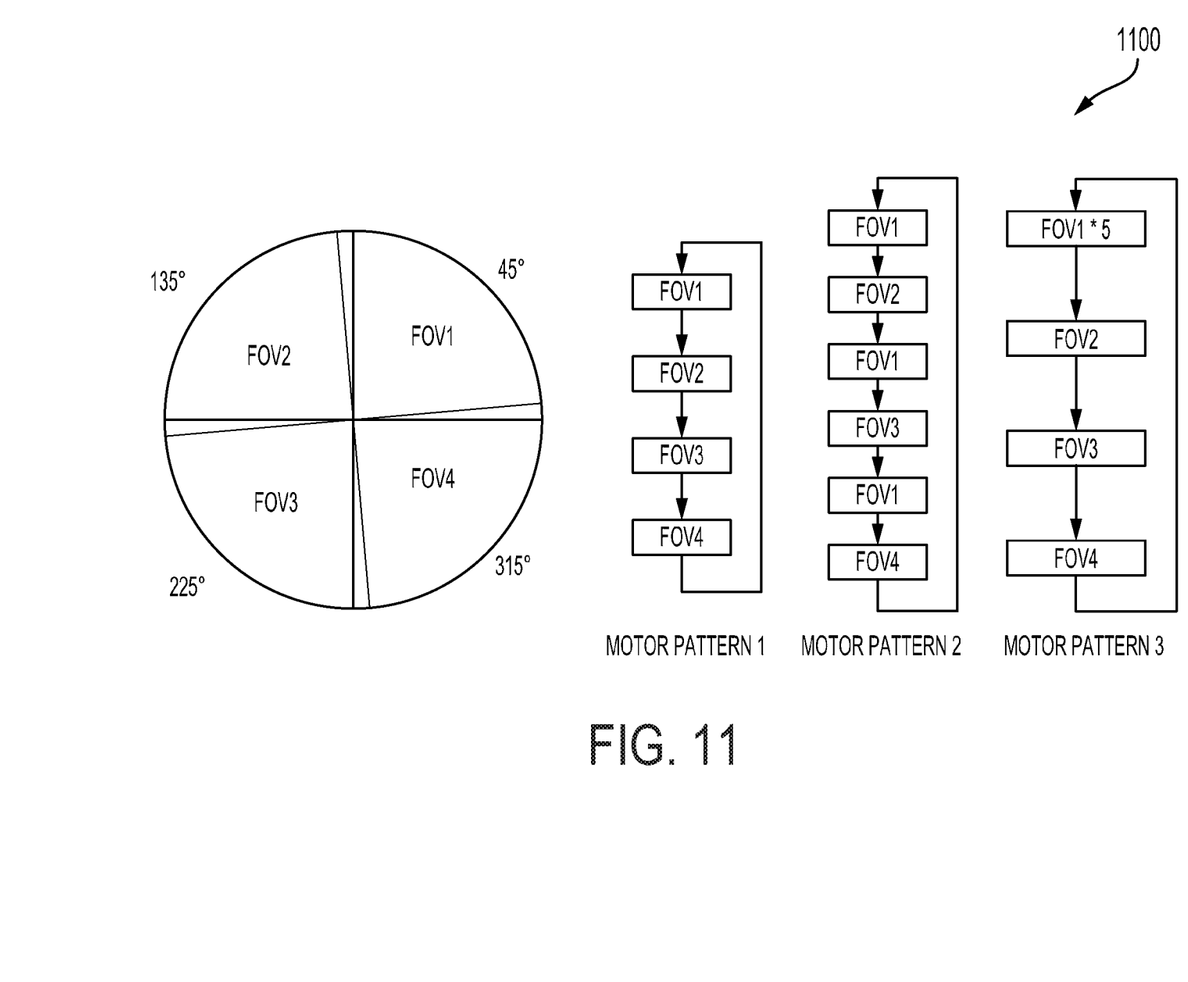
FIG. 11 illustrates motor patterns, according to example embodiments.

FIG. 11 illustrates motor patterns 1100, according to example embodiments. In the example of FIG. 10, the mirror rotates in a pattern shown in FIG. 11 as Motor Pattern 1. As a result, if the raw video is captured at 240 frames per second (fps), the final 360 degree video will be 30 fps because one 360 degree image frame is output for every 8 raw frames. The frame rate is uniform for every field angle.

In an example embodiment, the motor motion and camera image capture may be coordinated so as to capture different frame rates for different field angles. In one embodiment, we can rotate the mirror with a pattern shown in FIG. 11 as "Motor Pattern 2". With this pattern, we capture more frames for FOV1, and fewer frames for other field of views. For every consecutive 12 raw frames, we produce 3 good frames for FOV1, and 1 good frame for each of FOV2, FOV3 and FOV4. As a result, if we capture raw frames at 240 fps, we get 60 fps for FOV1 (0°-90°), and 20 fps for FOV2, FOV3, and FOV4 (90°-360°).

In another embodiment, the mirror may remain at FOV1 for 6×Te, so that we can read 5 good frames for FOV1; and then move mirror to FOV2 and stay for 2×Te, so that we can read 1 good frame for FOV2; and then continue the process as shown in FIG. 11: Motor Pattern 3. With this configuration, we are able to produce 5 good frames for FOV1, 1 good frames for each of FOV2, FOV3, and FOV4, from 12 raw frames. As a result, if we capture raw frames at 240 fps, then we get 100=240*5/12 fps for FOV1 (0°-90°), and 20 fps for FOV2, FOV3, and FOV4 (90°-360°).

By configuring mirror rotation patterns differently, we can achieve various frame rates for different field angles.

Note that although most examples above assume 4 mirror positions per cycle and the sum of field of view covers the whole 360 degree of field of view, the system may be configured to have more or less mirror positions per cycle. Furthermore, the system may include different rotation angles and cover different fields of view per cycle based on, for example, specific application needs.

F. Move the Rotational Mirror According to Image Analysis or User Input. In an example embodiment, the system rotates the reflective mirror at a uniform speed to scan a scene of large FOV (e.g., capture video of large FOV). For each image frame, an event detection may be performed. For example, motion detection can be done by measuring the difference among consecutive image frames; or face detection be done on each image frame by comparing each image frame to an image database. An event detection may include one or more objects. Once an event is detected in one field angle, the system may track this field angle and/or the object(s) at a higher frame rate, and capture other field angles at a lower frame rate, until the event ends or is no longer detectable, or until a new event is detected.

An example method is as follows:
1. Capture video of large FOV as the abovementioned Mode C or Mode D.
2. For each image frame:
   a) run event detections (e.g., motion detection, face detection, object detection)
   b) adjust the framerate at each field angle according to the detection result, so that field angles with detected events are assigned a higher frame rate than other field angles without detected events.
   c) adjust mirror motion to achieve the various framerate capturing as described in Mode E above.
   d) Loop to Step 2. In another embodiment, a user may interact with the system. For example, the user may input an desired angle range and/or region of interest:
1. Capture video of large FOV as the abovementioned Mode C or Mode D.
2. For each image frame:
   a) display the image frame.
   b) a user may indicate one or more regions of interest via certain input devices (e.g., touch screen, mouse, gesture, etc).
   c) adjust the framerate at each field angle according to the user indication, so that user-indicated field angles are assigned a higher frame rate than other field angles that are not user-indicated.
   d) adjust mirror motion to achieve the various framerate capturing as described in Mode E above.
   e) Loop to Step 2. In an example embodiment, the system need not capture wide FOV video. Instead, the system may capture a video with a normal FOV. The video may be displayed to users, who may adjust a field angle according to one or more indications.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

The invention claimed is:

1. A system comprising:
   a camera;
   a mirror optically coupled to the camera;
   a motor coupled to the mirror; and
   a controller comprising a memory and at least one processor, wherein the at least one processor is configured to execute instructions stored in the memory so as to carry operations, the operations comprising:
      adjusting the motor to a first position such that the camera has a first field of view;
      capturing, via the camera, an image frame of the first field of view;
      repeating the adjusting and capturing steps at respective positions and respective fields of view until a plurality of image frames have been captured that include a predetermined field of view, wherein the predetermined field of view comprises an angle greater than the first field of view; and
      combining the plurality of image frames so as to form an output image frame, wherein the camera comprises a global shutter, wherein adjusting the motor to a respective position comprises a movement time and a static time, wherein capturing an image frame comprises an exposure time, and wherein the static time is greater than or equal to two times the exposure time.

2. The system of claim 1, wherein the camera is incorporated into a mobile device, wherein the mobile device comprises a smartphone.

3. The system of claim 1, further comprising relay optics, wherein the mirror is optically coupled to the camera via the relay optics.

4. The system of claim 1, wherein the mirror comprises a plane mirror.

5. The system of claim 1, wherein the mirror comprises a cylindrical mirror or a spherical mirror.

6. The system of claim 1, wherein the controller comprises a camera control module and a motor control module communicatively coupled via a wireless communication interface.

7. The system of claim 1, wherein the operations comprise performing the adjusting and/or capturing steps synchronously with respect to each other.

8. The system of claim 1, wherein the operations comprise performing the adjusting and/or capturing steps asynchronously with respect to each other.

9. The system of claim 1, wherein the predetermined field of view comprises an angle equal to 360°.

10. A method comprising:
    adjusting a motor to a first position, wherein the motor is coupled to a mirror, wherein the mirror is optically coupled to a camera, and wherein the adjusting is performed such that the camera has a first field of view;
    capturing, via the camera, an image frame of the first field of view;
    repeating the adjusting and capturing steps at respective positions and respective fields of view until a plurality of image frames have been captured that include a predetermined field of view, wherein the predetermined field of view comprises an angle greater than the first field of view; and
    combining the plurality of image frames so as to form an output image frame, wherein the camera comprises a global shutter, wherein adjusting the motor to a respective position comprises a movement time and a static time, wherein capturing an image frame comprises an exposure time, and wherein the static time is greater than or equal to two times the exposure time.

11. The method of claim 10, wherein the operations comprise performing the adjusting and/or capturing steps synchronously with respect to each other.

12. The method of claim 10, wherein the operations comprise performing the adjusting and/or capturing steps asynchronously with respect to each other.

13. The method of claim 10, wherein the camera comprises a rolling shutter, wherein adjusting the motor to a respective position comprises a movement time and a static time, wherein capturing an image frame comprises an exposure time, a pixel readout time, and a pixel reset time, and wherein the static time is greater than or equal to two times the sum of the exposure time, the pixel readout time, and the pixel reset time.

14. The method of claim 10, further comprising determining a blurred condition for a respective image frame based on whether the mirror was moving while the respective image frame was being captured.

15. The method of claim 10, further comprising determining a blurred condition for a respective image frame based on an image comparison between the respective image frame and at least one adjacent image frame, wherein the image comparison is based on a sharpness of the compared image frames.

16. The method of claim 10, wherein capturing the respective image frames is provided according to a region of interest, wherein the plurality of image frames comprises more image frames from the field of view corresponding to the region of interest as compared to other fields of view.

17. The method of claim 10, further comprising determining an event, wherein capturing the respective image frames is provided according to the determined event, wherein the plurality of image frames comprises more image frames from the field of view corresponding to the determined event as compared to other fields of view.

18. The method of claim 17, wherein determining an event comprises one of motion detection, image detection, face detection, gesture detection, or object detection.

19. The method of claim 17, wherein determining an event comprises a user interaction.

20. The method of claim 10, wherein the camera has a field of view of greater than 90 degrees and wherein combining the plurality of image frames comprises combining at least four image frames so as to form the output image frame.

21. The method of claim 10, wherein the predetermined field of view comprises an angle equal to 360°.

* * * * *